Feb. 27, 1962

C. B. TRONSLIN ETAL 3,023,280

DEGAUSSING APPARATUS

Filed July 30, 1958

CYRIL B. TRONSLIN
JOHN F. SWEENEY JR.
DWIGHT W. BREDE
JAMES W. DORSETT JR.
INVENTORS

BY
Flehr and Swain
ATTORNEYS

CYRIL B. TRONSLIN
JOHN F. SWEENEY JR.
DWIGHT W. BREDE
JAMES W. DORSETT JR.
INVENTORS

Feb. 27, 1962   C. B. TRONSLIN ETAL   3,023,280
DEGAUSSING APPARATUS
Filed July 30, 1958   4 Sheets-Sheet 3

CYRIL B. TRONSLIN
JOHN F. SWEENEY JR.
DWIGHT W. BREDE
JAMES W. DORSETT JR.
INVENTORS

BY
Flehr and Swain
ATTORNEYS

Feb. 27, 1962 C. B. TRONSLIN ETAL 3,023,280
DEGAUSSING APPARATUS
Filed July 30, 1958 4 Sheets-Sheet 4

CYRIL B. TRONSLIN
JOHN F. SWEENEY JR.
DWIGHT W. BREDE
JAMES W. DORSETT JR.
INVENTORS

BY
Flehr and Swain
ATTORNEYS

United States Patent Office 3,023,280
Patented Feb. 27, 1962

3,023,280
DEGAUSSING APPARATUS
Cyril B. Tronslin, Palo Alto, John F. Sweeney, Jr., Los Altos, Dwight W. Brede, Mountain View, and James W. Dorsett, Jr., Tustin, Calif., assignors to Ampex Corporation, Redwood City, Calif., a corporation of California
Filed July 30, 1958, Ser. No. 752,118
13 Claims. (Cl. 179—100.2)

This invention relates generally to degaussing apparatus and more particularly to degaussing apparatus suitable for degaussing bulk magnetic tape.

It is a general object of the present invention to provide a degaussing apparatus suitable for degaussing bulk magnetic tape.

It is another object of the present invention to provide a degaussing apparatus in which the magnetic fields are such that the bulk magnetic tape is intercepted in turn by the equivalent of four separate fields having directions 90° apart.

It is another object of the present invention to provide an apparatus of the above character in which good erasure is assured by constant rotation of the reel, smooth passage of the degaussing coils past the reel, and by exposing the bulk tape to decreasing magnetic fields as it is passed through the fringe fields.

It is another object of the present invention to provide an apparatus of the above character which is compact, easy to operate, easy to load, and which is automatic in operation.

These and other objects of the invention will become more clearly apparent from the following description when taken in conjunction with the accompanying drawing.

Referring to the drawing.

Figure 3:
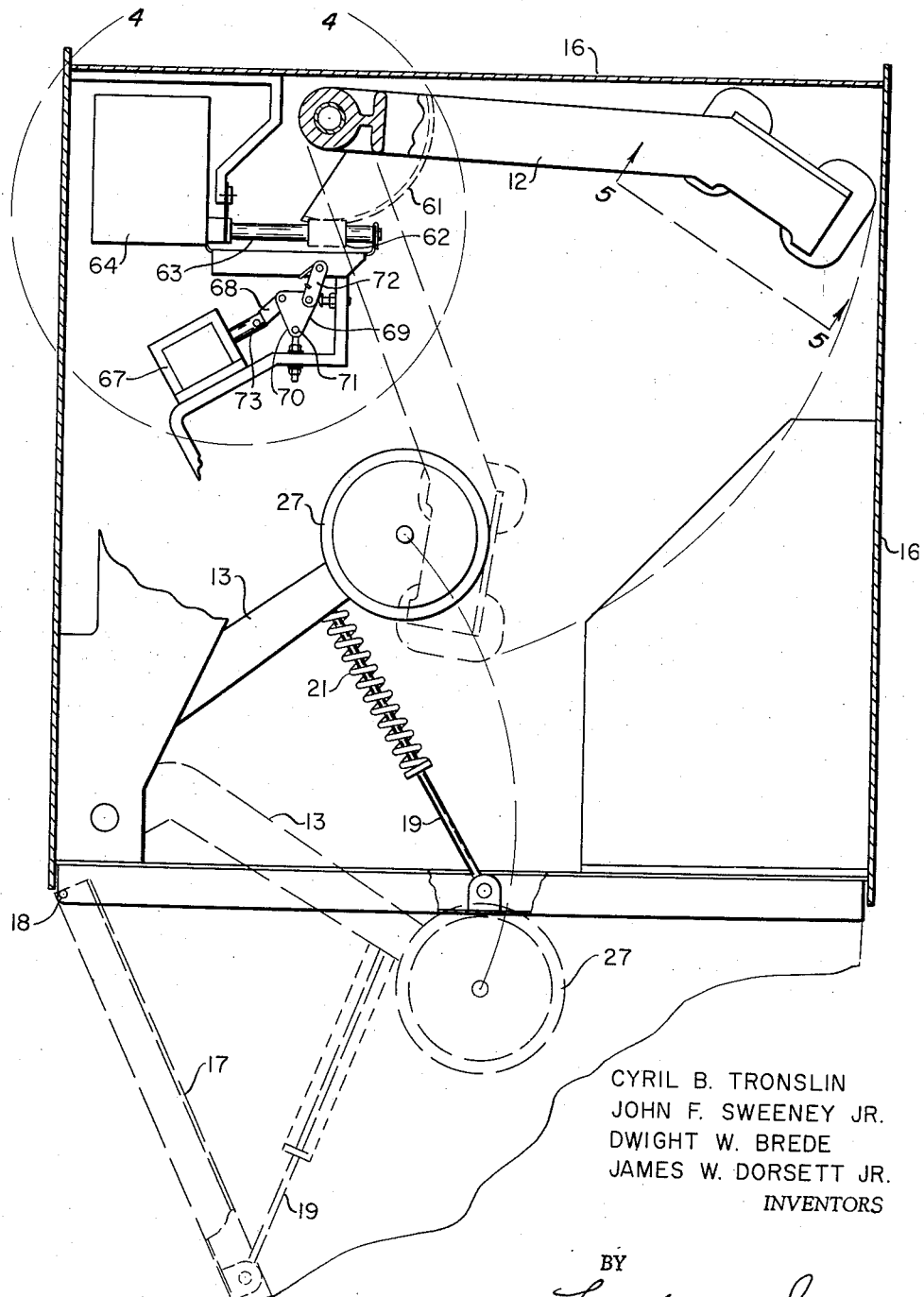
FIGURE 3 is a plan view, partly in section, of the apparatus.

The apparatus includes a frame 11 which pivotally mounts a degaussing arm 12 and a turntable arm 13. The frame 11 is mounted on a base 14 and a cabinet 16 (FIGURE 3) serves to enclose the working parts. A door 17 is hinged 18 to the frame and adapted to swing outwardly. A rod 19 is pivotally secured at one end to the door and is accommodated in a hole (not shown) in the turntable arm 13. The rod 19 carries a spring 21 which, when the door is closed, is in a compressed condition to urge the arm 13 inwardly to its limited inward position where the motor housing 22 abuts the stop 23. The stop may be made of soft, deformable material such as foam rubber. The stop 23 is mounted on a cross bracket 24 suitably secured to the frame.

A turntable shaft 26 carries the turntable 27 at one end and a pulley 28 at its other end. The shaft is suitably carried on the end of the arm 13 in bearings. The turntable 27 is adapted to receive a reel which is to be degaussed. The pulley 28 is engaged by a belt 29 which is driven by the pulley 31 carried on the motor shaft of the motor enclosed in the housing 22 and shown at 32.

In operation, the door is opened, swinging the arm 13 outwardly, whereby the turntable is accessible. The reel is then placed on the turntable and the door closed, urging the arm 13 inwardly and the motor housing 22 until the housing abuts against the abutment 23 in which case it is in its proper position for an erase operation as will be presently described. The positions of the arm with the door fully opened and fully closed is best illustrated in the plan view of FIGURE 3. The door also serves to initiate a cycle of operation when it is closed, as will presently be described.

The arm 12 carries the degaussing heads 36 and 37. Each of these heads includes a pair of coils (FIGURE 5) which are wound on the outer legs of a laminated E frame magnetic core assembly. Degaussing head 36 includes coils 41 and 42, and degaussing head 37 includes coils 43 and 44. This is more clearly illustrated in FIGURE 5 wherein the E frames are shown at 46 and 47 and the coils 41, 42 and 43, 44 respectively are shown wound on a leg of the E frames. The ends of the degaussing heads 36 and 37 are spaced apart a distance such that a reel of magnetic tape may be passed between the same, and yet they are relatively close to the tape. The arm 12 is pivotally carried on the frame as previously described and adapted to swing outwardly in the position shown in FIGURES 1 and 3 from the center position shown dotted in FIGURE 3 wherein the degaussing heads span the center of a reel which is placed in cooperative relationship when the door is closed.

Suitable means are provided for causing the arm to move rapidly toward the center and slowly outwardly to erase the magnetic tape. In the embodiment illustrated in FIGURES 1–4, the arm 12 is spring loaded by means of a spring 51 whereby the spring serves to urge the same inwardly when it is released. The spring is fixed at one end 52 to the arm 12 and at its other end 53 to the frame. When the arm 12 swings inwardly, it abuts against the resilient pad 54 which stops its motion.

Figure 1:
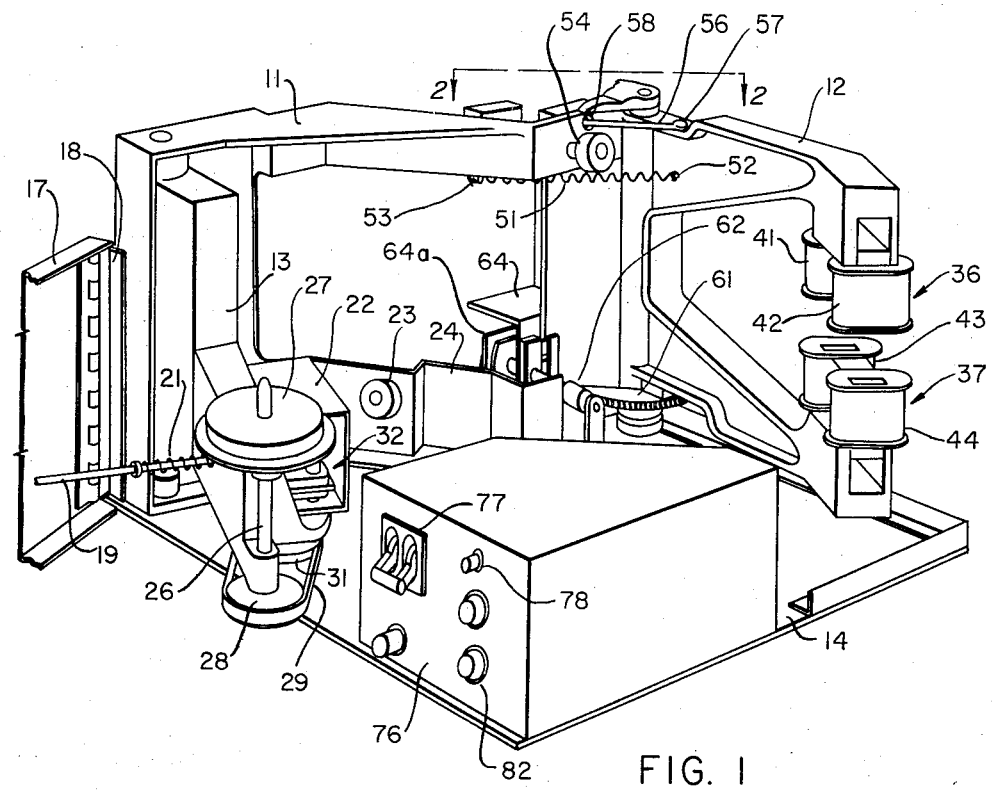
FIGURE 1 is a perspective view of a degaussing apparatus with the cabinet removed to better illustrate the working parts.
Figure 2:
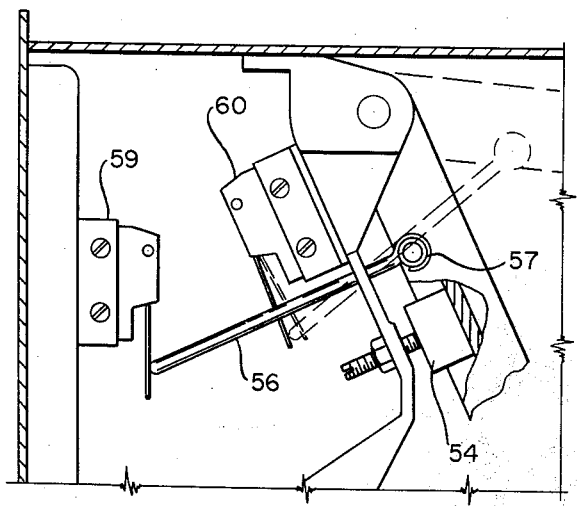
FIGURE 2 is a partial plan view taken in the direction of the line 2—2 of FIGURE 1.

A limit rod 56 is pivotally carried at 57 (FIGURE 2) by the arm 12, and its other end extends through the opening 58 (FIGURE 1) formed in the frame. The end of the rod 56 has a portion bent at right angles thereto whereby the same can engage the switch 59 when the arm is in its inward position and against the abutment 54 and serves to activate the switch 60 when in its extreme outward position, as shown in FIGURES 1 and 2.

Figure 4:
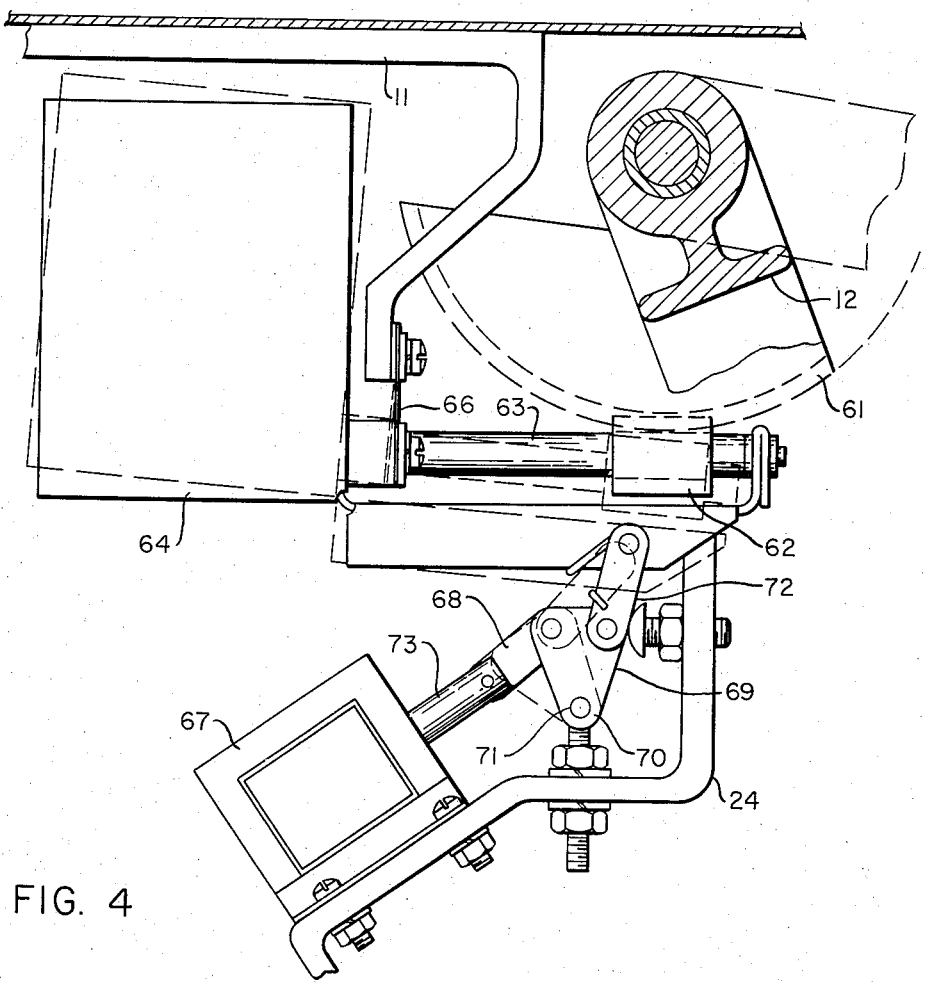
FIGURE 4 is an enlarged view taken along the line 4—4 of FIGURE 3.

The lower portion of the arm 12 carries a partial worm gear 61 which is engaged by the worm 62. When the two gears are meshed, the worm serves to drive the arm 12 outwardly against the tension of the spring 51. Means are provided for releasing the worm 62 from the gear 61 whereby the arm 12 is allowed to swing inwardly under the urging of the spring 51. Such means are illustrated in FIGURE 4. The worm 62 is driven through the shaft 63 by a motor 64a (FIGURE 1) mounted in the motor housing 64. The shaft 63 is journaled at both ends in the mounting member as shown. The complete assembly is mounted by a leaf spring 66 or the like to the frame. Thus, the complete assembly can be moved between the extreme positions as indicated by the solid and dotted lines. When moved to the position shown by the dotted lines, FIGURE 4, the worm 62 is disengaged from the gear 61 and the degaussing head arm is allowed to swing inwardly to the center of an associated reel. A solenoid 67 is provided for automatically releasing the worm from the gear section 61. The solenoid operates through the linkage illustrated. The linkage includes a link 68 pivotally mounted to the crank link 69. One end 70 of the crank link 69 is pivotally secured to the frame as indicated at 71 and its other end is pivotally secured to a link 72 which is attached to the motor mount. By energizing the solenoid, the solenoid arm 73 is drawn inwardly, drawing the motor mount into the position shown by the dotted line.

Figure 5:
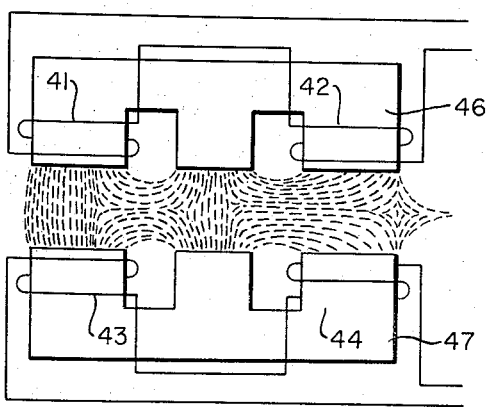
FIGURE 5 shows the coils and the configuration of the magnetic fields.

As previously described, each of the degausser heads includes laminated E frames having coils on their outer legs. The pair of coils on each frame is identical. However, they are connected in such a manner that at one end their magnetic fields are aiding as illustrated in the left of FIGURE 5, and in the other end, they are bucking, as illustrated in the right of FIGURE 5. As a result of this connection, it will be seen that at the left end there is a strong vertical field, and at the other end, a strong horizontal field. The coils are energized by an alternating current whereby the fileds are continuously reversing. It will then be seen that the tape is intercepted in turn by the equivalent of four separate fields with their directions 90° apart. From a magnetic standpoint, this provides excellent erasure.

Figure 7:
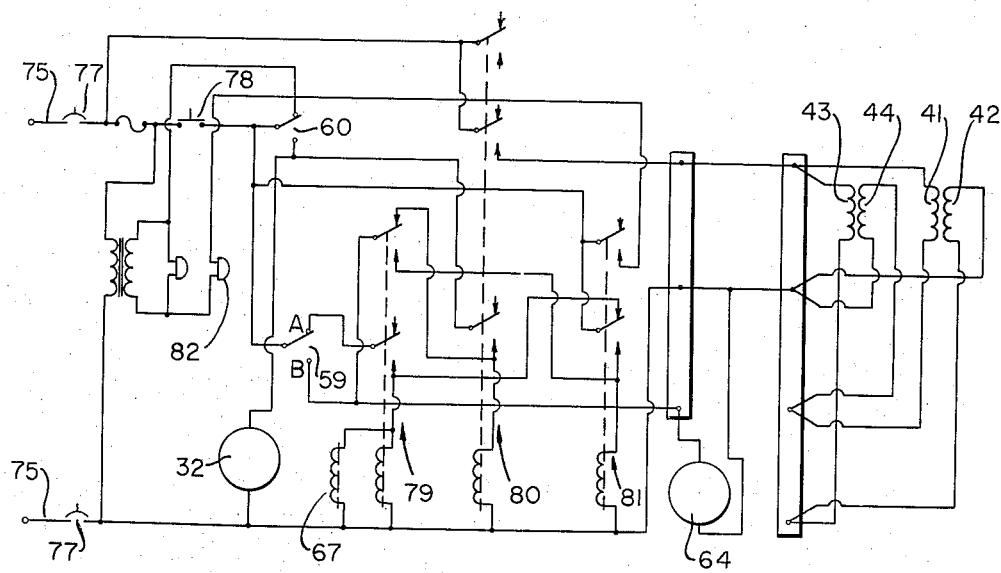
FIGURE 7 is a circuit diagram of the control circuits used in the machine.

A circuit diagram is illustrated in FIGURE 7. Power is supplied to the leads 75. A circuit breaker 77 (FIGURES 1 and 7) serves to connect the circuit to the power supply. A switch 78 (FIGURES 1 and 7) is placed in series with one of the power lines and is actuated by the door as it is closed. The switches 59 and 60 serve to control energization of the relays 79, 80 and 81. The relay contacts are shown in the deenergized position. The switch 60 is shown in the position which it attains when the arm 12 is in its outermost position. The switch 59 is shown in its normal operating position. The switch 59 is switched from the terminal 59A to the terminal 59B when the arm 12 is in its innermost position.

Operation of the machine and circuit is as follows. The operator opens the door which causes the turntable to emerge from the degausser. The reel is then placed on the turntable. The circuit breaker 77 is closed.

When the door is closed, it actuates the switch 78. The degaussing head arm is disposed outwardly in its extreme position and remains there because of the engagement of the worm with the partial worm gear. When the switch 78 is closed, power is supplied to energize the coil of the relay 79 through the upper contact of the relay 81. The worm pull-out solenoid 67 is energized whereby the degaussing arm swings inwardly to its center position. The contactors of relay 79 move to the lower position.

When the arm has moved fully inwardly, the switch 59 is tripped which causes the relay 81 to be energized through the lower contact of relay 79, moving its contactors downwardly. This deenergizes the relay 79 and its contractors move upwardly and energize the relay 80. When the relay 80 is energized, its coil is connected through the lower contact to the power source and it remains energized. When the switch 59 is triggered, power is supplied to the motor 64 which begins to move the degaussing arm 12 outwardly. This motor remains energized even when the switch 59 resumes its rest position since it is connected through the lower contact of the relay 80 and the upper contact of the relay 79 to the power source.

Energization of the relay 80 also serves to energize the upper and lower degaussing coils. When the arm has moved outwardly to its extreme position, it activates the switch 60 which causes the relay 80 to become deenergized and which forms a closed circuit for the erase light 82. A new cycle of operation is not initiated since the relay is energized with its contactors in the lower position.

To commence another cycle, the door is opened thereby disconnecting the power and allowing the relay 81 to assume its deenergized position, contactors up. Closing of the door initiates a new cycle of operation.

It will be apparent that the circuit also includes a built-in safety feature. That is, if the power should fail for any reason, or if the apparatus is turned off in the middle of an erase cycle, then the relay 81 will assume its deenergized position whereby when the power is again applied the apparatus will recycle.

From a mechanical standpoint, a good erasure is assured by the constant rotation of the reel and by the smooth passage of the heads over it. As the heads move away from the reel, the tape is gradually exposed to less and less magnetic field as it passes through the fringe of the field. This is accomplished in a very small space since the coils are moved into a corner of the cabinet where the sheet iron housing or a sheet of sheet iron is provided to shunt the fields. The magnetic fields are decreased rapidly and smoothly in a short amount of travel.

Figure 6:
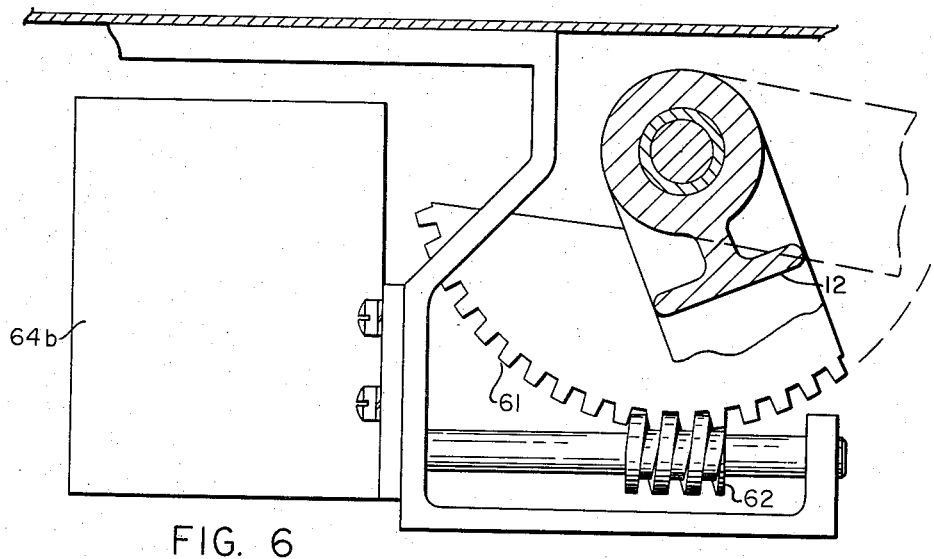
FIGURE 6 shows another embodiment of the invention.

Another embodiment of the invention is schematically illustrated in FIGURE 6. Rather than employing a worm and gear which are disengaged to allow the arm to be urged back to its center position by a spring, the worm and gear are continuously engaged and a reversible two-speed motor is employed to move the degaussing arm 12. Referring particularly to the figure, the degaussing arm 12, partial worm gear 61 and worm 62 are illustrated. A motor 64b is employed to drive the worm. The motor may be of the type which has a relatively slow forward speed, for example, 20 r.p.m., and a relatively fast reverse speed, for example, 200 r.p.m. The relay 79 can be connected to appropriately energize the two sets of windings to provide rapid movement of the arm towards the center and relatively slow movement outwardly during the degaussing operation.

Thus, it is seen that a compact, easy to operate degaussing apparatus is provided. The magnetic fields to which the tape is subjected are the equivalent of four fields which have directions 90° apart to provide competent erasure. To decrease the fields gradually in the limited space occupied by the machine, a shunt is provided for shunting the fields as the arm swings outwardly. The complete assembly is semi-automatic in operation, the apparatus is easy to load, and the mechanical motion of the various parts is smooth, providing an effective and efficient erasure of the bulk magnetic tape.

We claim:

1. A degaussing apparatus of the type adapted to erase a reel of magnetic tape comprising a pair of spaced degaussing heads adapted to straddle the reel whereby their magnetic fields pass through the tape to erase the same, means for mounting the reel, means serving to rotate said reel mounting means, means for moving the reel and heads relative to each other whereby the heads scan the reel outwardly, and means serving to shunt the magnetic field when the heads approach the outside edge of the reel.

2. A degaussing apparatus of the type adapted to erase a coil of magnetic tape comprising a pair of spaced degaussing heads adapted to straddle the coil whereby their magnetic fields pass through the tape to thereby erase the same, means for mounting the coil for rotative movement, means for moving the coil and heads relative to each other whereby the coil is scanned outwardly by the heads, said heads each comprising an E frame core having a pair of electrical coils mounted on the outer legs of the E frame and energized whereby the fields between one opposed spaced pair of electrical coils are aiding and the fields between the other spaced pair are bucking, and said E frame cores being arranged in a tangential plane of at least one of the loops of said tape coil with the legs of said frames extending toward one another.

3. A degaussing apparatus of the type adapted to erase a reel of magnetic tape comprising a pair of spaced degaussing heads adapted to straddle the reel whereby their magnetic fields pass through the tape to erase the same, means for mounting the reel for rotation, means for rotating said reel, an arm serving to carry said heads and adapted to swing the heads outwardly with respect to the reel whereby they move from the center to the edge of the reel, means for driving said arm whereby it is driven smoothly outwardly, and means for shunting the magnetic fields when the arm approaches the extreme outward position.

4. A degaussing apparatus of the type adapted to erase a coil of magnetic tape comprising a pair of spaced degaussing heads adapted to straddle the coil whereby the magnetic fields are passed through the tape to erase the same with said fields lying in a tangential plane of at least one of the loops of said coil, one of said fields being aligned parallel to the length of said tape in said loop and the other field being aligned transverse to the length of the tape in said loop, and said fields being spaced in the direction of the length of the tape in said loop, means for mounting the coil for rotation, means for rotating said coil, an arm serving to carry said heads and adapted to swing the heads with respect to the coil whereby they swing from the center of the coil outward, means for moving said arm towards the center at a relatively high speed and means for moving said arm outwardly at a relatively low speed.

5. Apparatus as in claim 4 wherein said means for moving the apparatus towards the center at a relatively high speed comprises spring means and wherein said means for driving the arm outwardly comprises a releasable means.

6. Apparatus as in claim 4 wherein a motor serves to move the arm towards the center of the reel at a relatively rapid speed and wherein the same motor is adapted to move the arm outwardly at a relatively low speed.

7. A degaussing apparatus of the type adapted to erase a reel of magnetic tape comprising a pair of spaced degaussing heads adapted to span the reel whereby the magnetic fields pass through the tape to erase the same, a turntable, an arm serving to mount said turntable, said arm being adapted to swing outwardly and inwardly, means for rotating said turntable, an arm serving to carry said heads and adapted to swing the heads with respect to the reel whereby the heads may be swung inwardly to the center of the reel and outwardly to the edges of the same, means for moving said arm towards the center at a relatively high speed and means for moving said arm outwardly at a relatively low speed, each of said heads comprising an E frame carrying a coil on the outer legs of the same, the opposed coils of said heads being energized to form aiding and bucking magnetic fields, and means serving to shunt the magnetic field when the degaussing heads are swung outwardly to the outside edge of the reel.

8. Apparatus as in claim 7 wherein said means for moving the apparatus towards the center at a relatively high speed comprises spring means and wherein said means for driving the arm outwardly comprises a releasable means.

9. Apparatus as in claim 7 wherein a motor serves to move the arm towards the center of the reel at a relatively rapid speed and wherein the same motor is adapted to move the arm outwardly at a relatively low speed.

10. A degaussing apparatus of the type adapted to erase a reel of magnetic tape comprising a pair of spaced degaussing heads adapted to span the reel whereby the magnetic fields pass through the tape to erase the same, a turntable, a turntable arm serving to mount the turntable and adapted to swing outwardly and inwardly, means for rotating said turntable, an arm serving to carry said heads and adapted to swing the heads with respect to the reel whereby the heads may be swung inwardly to the center of the reel and outwardly to the edges of the same, means for moving said arm inwardly towards the center of the reel, means for moving said arm outwardly towards the edge of the reel, each of said heads comprising an E frame carrying a coil on the outer legs of the same, the opposed coils of said heads being energized to form aiding and bucking magnetic fields, means serving to shunt the magnetic field when the degaussing heads are swung outwardly to the outer edge of the reel, and circuit means serving to control energization of the means for moving the arm which carries the heads and the coils in such a manner that the arm is swung inwardly, the coils are energized and the arm is moved outwardly to erase the magnetic tape.

11. A degaussing apparatus of the type adapted to erase a reel of magnetic tape comprising a housing, a door hingably secured to said housing and adapted to swing outwardly, a turntable, a turntable arm serving to carry the turntable, and adapted to swing outwardly when the door is opened whereby a reel may be mounted on the turntable and adapted to swing inwardly when the door is closed, motive means for rotating said turntable, spaced degaussing heads adapted to span the reel whereby their magnetic fields pass through the tape to erase the same, a degaussing arm serving to carry said heads and adapted to move the heads with respect to the reel whereby the heads may be swung inwardly to the center of the reel and outwardly to the edge of the same, means for moving said degaussing arm so that the heads move towards the center of the reel at a relatively high speed and outwardly from the center to the edge at a relatively slow speed, circuit means for controlling energization of the turntable motive means, means for moving the degaussing arm and the degaussing heads, said circuit means including programmed relays and a switch which is actuated upon closure of the door to start a program cycle, said relays being so arranged that the degaussing arm motive means is energized to allow the degaussing arm to move inwardly towards the center, and the degaussing heads and the degaussing arm motive means are energized when the degaussing arm has reached its external inward travel whereby the arm is moved outwardly to erase the tape.

12. Apparatus as in claim 11 wherein said circuit means includes interlocking relays to provide for re-programming in the event that the power to the apparatus is turned off during a programming cycle.

13. A degaussing apparatus of the type adapted to erase a coil of magnetic tape comprising, means for mounting and rotating said coil, means straddling said coil for establishing a pair of magnetic fields at right angles to one another in the tangential plane of at least one of the loops of said coil with said fields being spaced in the direction of rotation of said coil, and means for moving said second named means and said coil relative to each other whereby said second named means scan the coil radially.

References Cited in the file of this patent
UNITED STATES PATENTS

| 2,846,518 | Goehner et al. | Aug. 5, 1958 |

FOREIGN PATENTS

| 667,011 | Great Britain | Feb. 20, 1952 |
| 754,413 | Germany | Oct. 27, 1952 |
| 769,727 | Great Britain | Mar. 13, 1957 |